(12) United States Patent
Terada et al.

(10) Patent No.: US 7,335,875 B2
(45) Date of Patent: Feb. 26, 2008

(54) OPTICAL BRANCHING UNIT, AND METHOD OF MANUFACTURING THE SAME

(75) Inventors: Yusuke Terada, Yokohama (JP); Yutaka Natsume, Yokohama (JP)

(73) Assignee: Omron Corporation, Kyoto-shi (JP)

( * ) Notice: Subject to any disclaimer, the term of this patent is extended or adjusted under 35 U.S.C. 154(b) by 0 days.

(21) Appl. No.: 11/601,558

(22) Filed: Nov. 17, 2006

(65) Prior Publication Data

US 2007/0086711 A1    Apr. 19, 2007

Related U.S. Application Data

(63) Continuation of application No. PCT/JP05/009780, filed on May 27, 2005.

(30) Foreign Application Priority Data

May 27, 2004   (JP) .............................. 2004-157506

(51) Int. Cl.
G02B 6/122   (2006.01)
G02B 6/255   (2006.01)
(52) U.S. Cl. ..................... 250/227.11; 385/42; 385/132
(58) Field of Classification Search ........... 250/227.11; 385/129–131, 15, 39, 42
See application file for complete search history.

(56) References Cited

U.S. PATENT DOCUMENTS 6,356,694 B1 * 3/2002 Weber ........................ 385/132

6,605,228 B1 * 8/2003 Kawaguchi et al. .......... 216/24
6,847,772 B2 * 1/2005 Inoue et al. ................. 385/129
2003/0091289 A1 * 5/2003 Saito et al. .................... 385/49

FOREIGN PATENT DOCUMENTS

| JP | 60-12515 A | 1/1985 |
| JP | 3-265802 A | 11/1991 |
| JP | 5-323136 A | 12/1993 |
| JP | 7-56032 A | 3/1995 |

(Continued)

OTHER PUBLICATIONS

Notification Concerning Transmittal of Copy of International Preliminary Report on Patentability, Chapter I of the Patent Cooperation Treaty, and Written Opinion of the International Searching Authority, dated Dec. 7, 2006, for PCT/JP2005/009780, 7 sheets.

*Primary Examiner*—John R. Lee
(74) *Attorney, Agent, or Firm*—Frishauf, Holtz, Goodman & Chick, P.C.

(57) ABSTRACT

An optical branching unit according to the invention, has on a substrate, a light input part which inputs light, an optical branch which branches the light input to the light input part at a predetermined ratio, a light output part which guides the light branched by the optical branch to a predetermined position, and a dummy pattern which is provided on a substrate independently of an area provided with the light input part, optical branch and light output part, made of the same material as the light input part, optical branch and light output part, and defined to have an area, so that an occupation rate, or a ratio of the dummy pattern to the area of a substrate except the light input part, optical branch and light output part, is 70% or higher.

12 Claims, 5 Drawing Sheets

FOREIGN PATENT DOCUMENTS

| | | |
|---|---|---|
| JP | 7-244223 A | 9/1995 |
| JP | 8-286064 A | 11/1996 |
| JP | 9-230155 A | 9/1997 |
| JP | 9-329720 A | 12/1997 |
| JP | 10-308555 A | 11/1998 |
| JP | 11-271545 A | 10/1999 |
| JP | 2000-147293 A | 5/2000 |
| JP | 2001-116940 A | 4/2001 |
| JP | 2001-255426 A | 9/2001 |
| JP | 2002-6153 A | 1/2002 |
| JP | 2002-228862 A | 8/2002 |
| JP | 2003-222747 A | 8/2003 |
| JP | 2003-315573 A | 11/2003 |
| WO | WO 94/10592 A1 | 5/1994 |

* cited by examiner

OPTICAL BRANCHING UNIT, AND METHOD OF MANUFACTURING THE SAME

CROSS-REFERENCE TO RELATED APPLICATIONS

This is a Continuation Application of PCT Application No. PCT/JP2005/009780, filed May 27, 2005, which was published under PCT Article 21 (2) in Japanese.

This application is based upon and claims the benefit of priority from prior Japanese Patent Application No. 2004-157506, filed May 27, 2004, the entire contents of which are incorporated herein by reference.

BACKGROUND OF THE INVENTION

1. Field of the Invention

The present invention relates to an optical branching unit, which is usable in the field of optical communication, and outputs a light beam input to an input end to a plurality of output end.

2. Description of the Related Art

A PLC (Planer Light Wave Circuit) component is known as an optical waveguide circuit component. As an example of the PLC component, an example has been reported, in which a pattern of an optical waveguide circuit is formed on a silicon substrate, and a partially independent core pattern is provided on the substrate provided with the optical waveguide circuit (Jpn. Pat. Appln. KOKAI Publication No. 11-271545).

However, in the proposal disclosed in the above Publication No. 11-271545, there is a problem peculiar to the structure of an optical branching that is a PLC component. Namely, the number (area) of waveguides is different in a light input side and a light output side, and an etching rate in dry etching for example is largely different on a substrate by a loading effect. As a result, after the etching, a line width of a curved waveguide in the input side is formed thinner than a designed value, and a loss in the curved waveguide is increased in a longer wavelength side of a wavelength in use. As a result, the uniformity in a wavelength of insertion loss of an optical branching unit becomes bad.

Further, after the etching, a clad layer is provided in all areas of a substrate including a core portion formed by etching, and the clad layer is protruded like a convex in a core portion. Thus, when a lid glass is fixed with an adhesive, a stress is concentrated on the core portion, and PDL (Polarization Dependent Loss) is degraded.

BRIEF SUMMARY OF THE INVENTION

It is an object of the present invention to provide an optical branching unit having a high wavelength uniformity of insertion loss, and a low polarization dependent loss.

This invention is provided an optical branching unit comprising: a light input part which inputs light; an optical branch which branches the light input to the light input part at a predetermined ratio; a light output part which guides the light branched by the optical branch to a predetermined position; an adhesive layer which is formed to a predetermined thickness on the light input part, optical branch and light output part; a substrate which holds the light input part, optical branch and light output part; a cover member which covers the light input part, optical branch and light output part on the substrate through the adhesive layer; and a stress equalizing member which is provided on the substrate independently of an area provided with the light input part, optical branch and light output part, and prevents a stress generated when the adhesive layer is hardened, from acting on any one or all of the light input part, optical branch and light output part on the substrate.

According to the above-mentioned optical branching unit, an influence of a stress generated when a cover member is fixed with an adhesive is decreased. Therefore, degradation of polarization dependent loss (PDL) after fixing the cover member is prevented.

Further, this invention is provided an optical branching unit comprising: a light input part which inputs light; an optical branch which branches the light input to the light input part at a predetermined ratio; a light output part which guides the light branched by the optical branch to a predetermined position; and a stress equalizing member which is provided on a substrate independently of an area provided with the light input part, optical branch and light output part, made of the same material as the light input part, optical branch and light output part, and defined to have an area, so that an occupation rate, or a ratio of the stress equalizing member to the area of a substrate except the light input part, optical branch and light output part, is 70% or higher.

Namely, in the above-mentioned optical branching unit, when etching areas used as a light input part, an optical branch and a light output part, an etching rate is substantially equal in all areas of a substrate. Therefore, by the loading effect, generation of difference in the thickness (width) of the areas used as the light input part, optical branch and light output part is prevented, and the width (thickness) of each area is made equal. Therefore, in a curved waveguide of an optical branching unit, an over loss in a longer wavelength side can be decreased, and the wavelength uniformity of insertion loss can be improved.

Further, this invention is provided a method of manufacturing an optical branching unit, comprising: stacking an optical transmission material layer with a refractive index higher than a substrate usable as an optical waveguide, to a predetermined thickness on a substrate; defining a first area which is used to transmit an optical signal, and a second area which is provided around the first area with a predetermined space, and used to make an etching rate of etching the first area substantially equal in all areas of a substrate; forming a non-etching pattern in each of the first area and second area, and patterning an remaining area of a substrate by etching; forming a third area different from the first and second areas by providing a material with a refractive index lower than the optical transmission material layer in all areas of an optical transmission material layer remained non-etched after the patterning and an exposed substrate area; and bonding a cover member to the third area through an adhesive.

According to a method of manufacturing an optical branching unit, an influence of a stress generated when a cover member is fixed with an adhesive is decreased. Therefore, degradation of polarization dependent loss (PDL) after fixing the cover member is prevented. As hereinbefore, it is possible to with a high yield, and a cost of the optical branching unit is lower.

Further, this invention is provided an optical branching unit comprising: a light input part which inputs light; an optical branch which branches the light input to the light input part at a predetermined ratio; a light output part which guides the light branched by the optical branch to a predetermined position; an adhesive layer which is formed to a predetermined thickness on the light input part, optical branch and light output part; a substrate which holds the light input part, optical branch and light output part; and a non-optical signal transmission area which is provided on the substrate independently of an area provided with the light input part, optical branch and light output part, and decreases a degree that a line width, or the length of each of the light input part, optical branch and light output part along the surface direction of the substrate becomes unequal, when the light input part, optical branch and light output part are formed on the substrate.

Namely, in the above-mentioned optical branching unit, when etching areas used as a light input part, an optical branch and a light output part, an etching rate is substantially equal in all areas of a substrate. Therefore, by the loading effect, generation of difference in the thickness (width) of the areas used as the light input part, optical branch and light output part is prevented, and the width (thickness) of each area is made equal. Therefore, in a curved waveguide of an optical branching unit, an over loss in a longer wavelength side can be decreased, and the wavelength uniformity of insertion loss can be improved.

Further, this invention is provided a method of manufacturing an optical branching unit, comprising: stacking an optical transmission material layer with a refractive index higher than a substrate usable as an optical waveguide, to a predetermined thickness on a substrate; defining a first area which is used to transmit an optical signal, and a second area which is provided around the first area with a predetermined space, and used to make an etching rate of etching the first area substantially equal in all areas of a substrate; forming a non-etching pattern in each of the first area and second area, and patterning an remaining area of a substrate by etching; and forming a third area different from the first and second areas by providing a material with a refractive index lower than the optical transmission material layer in all areas of an optical transmission material layer remained non-etched after the patterning and an exposed substrate area.

According to a method of manufacturing an optical branching unit, when etching a pattern used for transmission of an optical signal, an etching rate is varied by the loading effect depending on the positions on a substrate, and it is prevented that a line width of a curved waveguide in an input side becomes thinner than a designed value after the etching. Therefore, a loss in a curved waveguide is made uniform regardless of a wavelength in use, and optical characteristics are improved.

DETAILED DESCRIPTION OF THE INVENTION

Hereinafter embodiments of the invention will be explained in detail with reference to the accompanying drawings.

Figure 1:
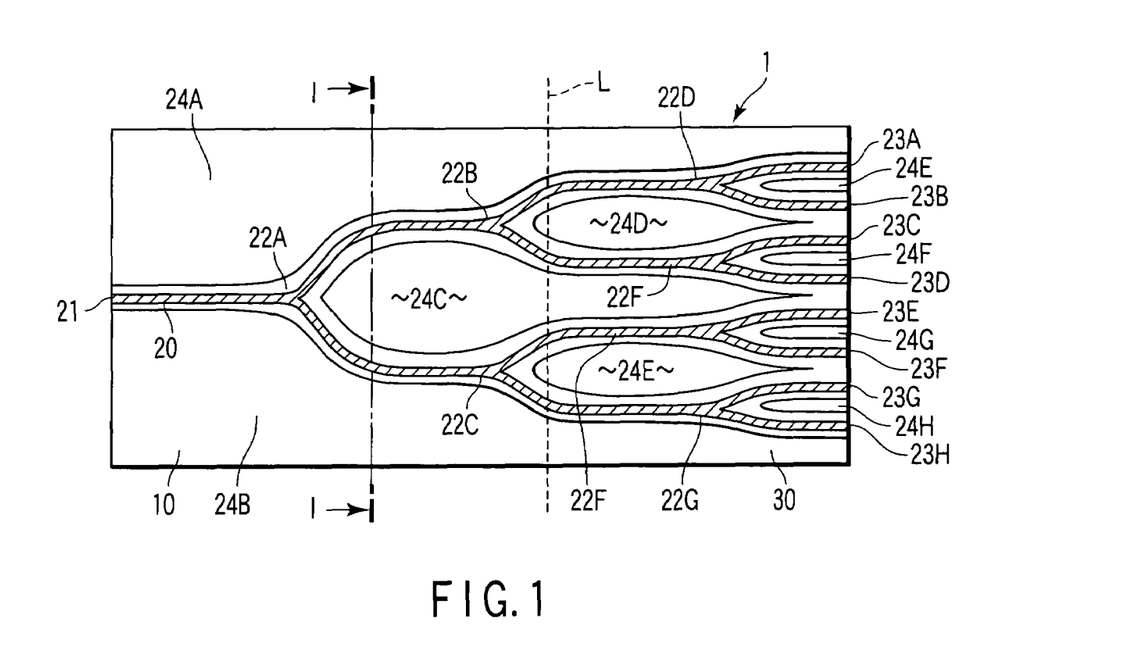
FIG. 1 is a schematic illustration explaining an example of an optical branching unit according to an embodiment of the invention.

FIG. 1 is a schematic illustration explaining an example of an optical branching unit according to an embodiment of the invention.

As shown in FIG. 1, an optical branching unit 1 has a substrate composed mainly of silicon dioxide ($SiO_2$), and an optical waveguide structure 20 formed by patterning in a predetermined shape on the substrate 10. The optical waveguide structure 20 is covered by a member functioning as a clad layer 30 to make the optical waveguide structure 20 usable as a core. A relative index difference between the core portion and clad area (clad layer 30) is 0.45%.

The optical waveguide structure 20 includes an input end 21 to input a light beam (an optical signal) supplied through a not-show optical transmission member, such as an optical fiber and an optical branching unit in a preceding stage, optical branches 22A-22G to branch optical signals applied to the input end 21 at first and second ratios, and output ends 23A and 23H to guide the optical signals branched by the optical branches 22A-22G (8 in this example) to a not-shown single mode fiber, or an optical branch unit in a succeeding stage.

In the area surrounding the optical waveguide structure 20, or the area to be covered by stacking the clad member 30, the material, which is the same as that used as a core portion stacked on the substrate 10 in the same step as the optical waveguide structure 20, is provided as a member 24A-24H, which equalizes the stress remained in a predetermined shape (hereinafter, called a dummy pattern), when patterning the core portion (optical waveguide structure) 20. Namely, the dummy patterns 24A-24H are remained not etched, when the core portion 20 is formed by etching by a dry etching method, for example.

The optical waveguide structure (core portion) 20 and dummy patterns 24A-24H are formed by patterning a quartz glass composed mainly of silicon oxide and formed to a predetermined thickness on the substrate 10. The optical waveguide structure 20 can also be formed by doping phosphorous (P), titanium (Ti), germanium (Ge) or aluminum (Al) in a core, or a part corresponding to the optical waveguide structure 20, after stacking a not-shown clad layer member to a predetermined thickness. The optical waveguide structure 20 can also be formed by selectively lowering a refractive index by doping boric acid (B) or fluorine (F) in an area corresponding to a not-shown clad layer area, after stacking a material with a refractive index usable as a core to a predetermined thickness in all areas of the substrate 10. Further, the optical waveguide structure 20 can also be formed by using a multi-component glass including an optional component with a thermal expansion ratio of lower than approximately $3.5 \times 10^{-6}$, and by selectively changing a refractive index of an area corresponding to a core (the optical waveguide structure 20) by exchanging an ion by the well-known ion exchanging method.

Figure 2:
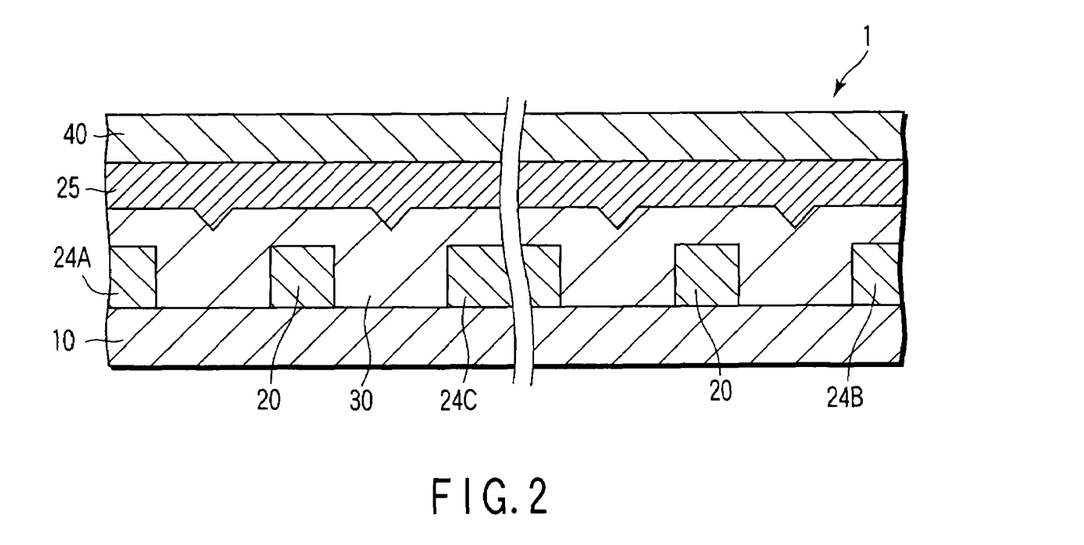
FIG. 2 is a schematic diagram of the optical branching unit shown in FIG. 1, taken along lines I-I.

FIG. 2 shows the optical branching unit shown in FIG. 1, taken along lines I-I.

As shown in FIG. 2, the optical waveguide structure (core portion) 20, dummy patterns 24A-24H (only 24A-24C are seen in the cross section taken along lines I-I of FIG. 2), and clad layer 30 are stacked on the substrate 10. An adhesive layer 25 is formed to a predetermined thickness on the clad layer 30. A lid or a cover glass layer 40 is fixed to the clad layer 30 through the adhesive layer 25. In the optical branching unit 1 shown in FIG. 1 and FIG. 2, the thickness of the substrate 10 is approximately 1 mm, the thickness of the core portion (optical waveguide structure) 20 and the length in the direction along the substrate 10 are approximately 6 μm (a square with one side of approximately 6 μm in a cross section), the thickness of dummy pattern 24A-24H is approximately 6 μm (the width differs according to positions), the thickness of the clad layer 30 is approximately 25 μm, the thickness of the adhesive layer 25 is approximately 25 μm, and the thickness of the lid 40 is approximately 1.5 μm. The thickness of the adhesive layer 25 is preferably in a range of 10-50 μm, and set by considering the bonding strength of the lid 40 and deterioration of PDL.

Further, as apparent from FIG. 2, the core portion 20 formed by patterning the optical waveguide structure (20) in a predetermined width (the length in the direction along the surface direction of the substrate 10) parted by the dummy patterns 24A-24H (only 24A-24C in FIG. 2) on both sides (except the end of the substrate 10). The space between the core portions 20 and the dummy patterns 24A-24H is defined to the same or over the width (thickness) of at least the core portion 20, as explained later in FIG. 4. Therefore, in FIG. 1, concerning the core portions (20) indicated by the output ends 23A-23H, the dummy patterns 24E-24H may be omitted, depending on the intervals (the number of branches) among the core portions.

FIGS. 3A-3F are views explaining an example of a process (method) of manufacturing the optical branching unit shown in FIG. 1 and FIG. 2.

Figure 3A:
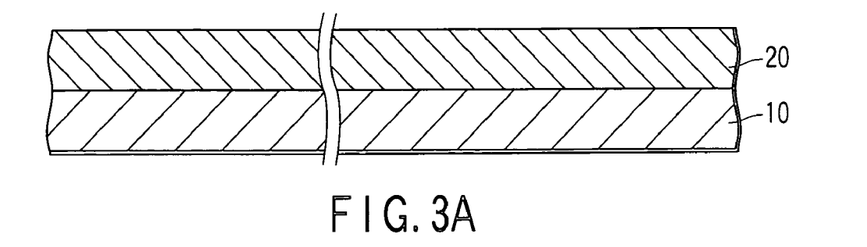
FIG. 3A is view showing an example of a process of manufacturing the optical branching unit shown in FIG. 1 and FIG. 2.

As shown in FIG. 3A, a glass plate composed mainly of silicon dioxide is prepared first as a substrate 10. Then, material such as silicon dioxide used as an optical waveguide structure 20 and dummy patterns 24A-24H with a refractive index higher than the substrate 10 is stacked to a predetermined thickness by a CVD method (chemical vapor deposition method). On the silicon dioxide thin layer used as an optical waveguide structure 20, phosphorous (P), titanium (Ti), germanium (Ge) or aluminum (Al) is doped if necessary to increase the refractive index.

Figure 3B:
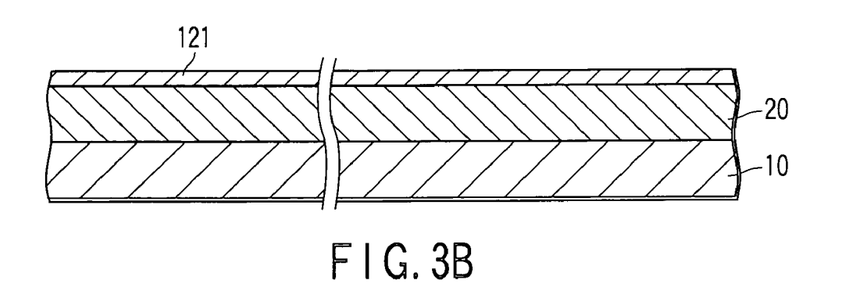
FIG. 3B is view showing an example of a process subsequent to the process of manufacturing the optical branching unit shown in FIG. 3A.

Then, as shown in FIG. 3B, a protection film 121 of wolfram silicyde (WSi) for example is stacked to a predetermined thickness on the silicone dioxide layer (20).

Figure 3C:
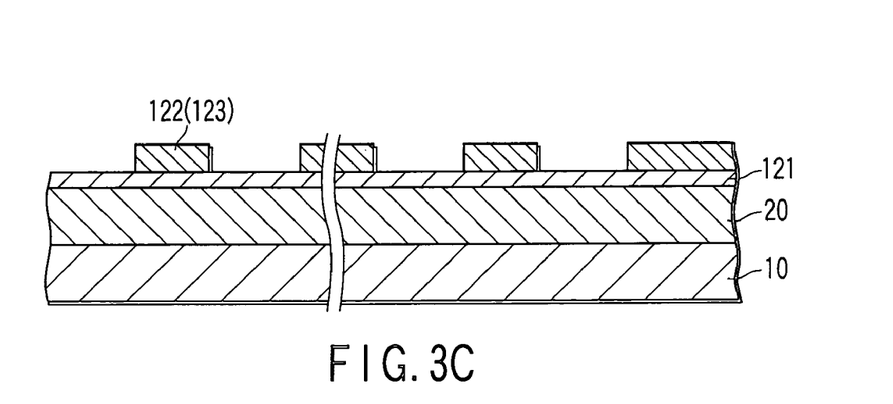
FIG. 3C is view showing an example of a process subsequent to the process of manufacturing the optical branching unit shown in FIG. 3B.

Next, a resist material 122 (anti-etching material such as a photoplastic resin) is applied to a predetermined thickness on the protection film 121. After the resist material is hardened in a not-shown drying process, patterns corresponding to the core portion 20 and dummy patterns 24A-24H are recorded (exposed). Thereafter, in a not-shown developing process, the resist material is developed, and resist patterns 123 (protection films formed as non-etching patterns) corresponding to the core portion 20 and dummy patterns 24A-24H are formed.

Figure 3D:
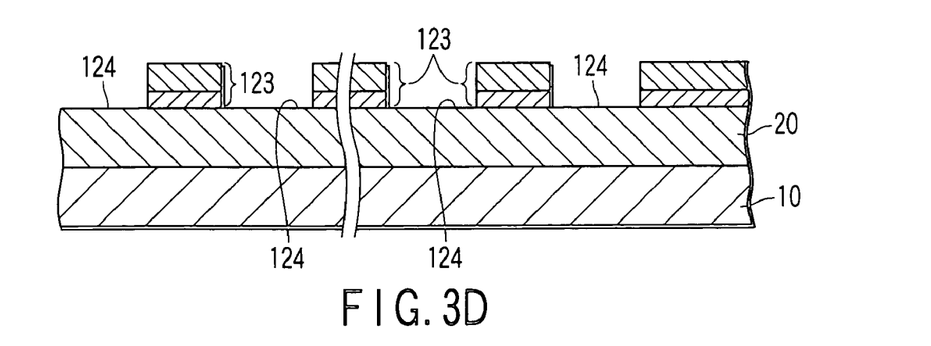
FIG. 3D is view showing an example of a process subsequent to the process of manufacturing the optical branching unit shown in FIG. 3C.

Next, as shown in FIG. 3D, the protection film 121 in the area to be etched is eliminated by etching, for example. Therefore, the etching part 124 to be etched of the layer with a high refractive index (silicon dioxide) previously stacked to a predetermined thickness as an optical waveguide structure 20 on the substrate 10 is exposed in a subsequent process.

Figure 3E:
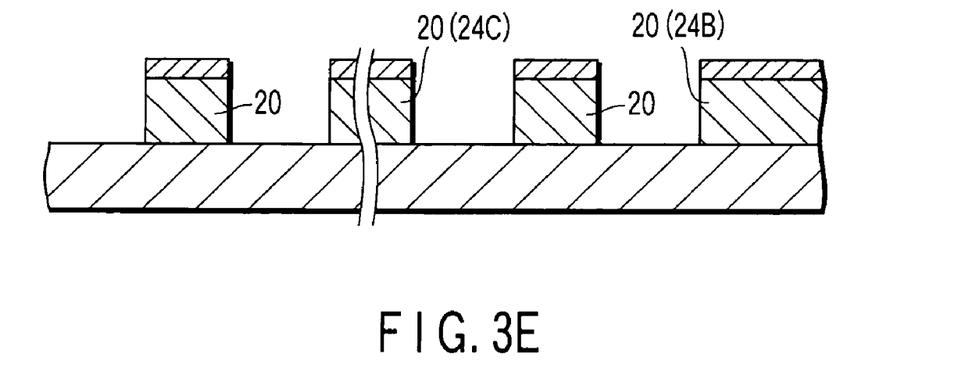
FIG. 3E is view showing an example of a process subsequent to the process of manufacturing the optical branching unit shown in FIG. 3D.

Then, as shown in FIG. 3E, the etching part 124 is eliminated by the well-known dry etching method, and the core 20 and dummy patterns 24A-24H (24B and 24C in FIG. 3E) are formed.

Figure 3F:
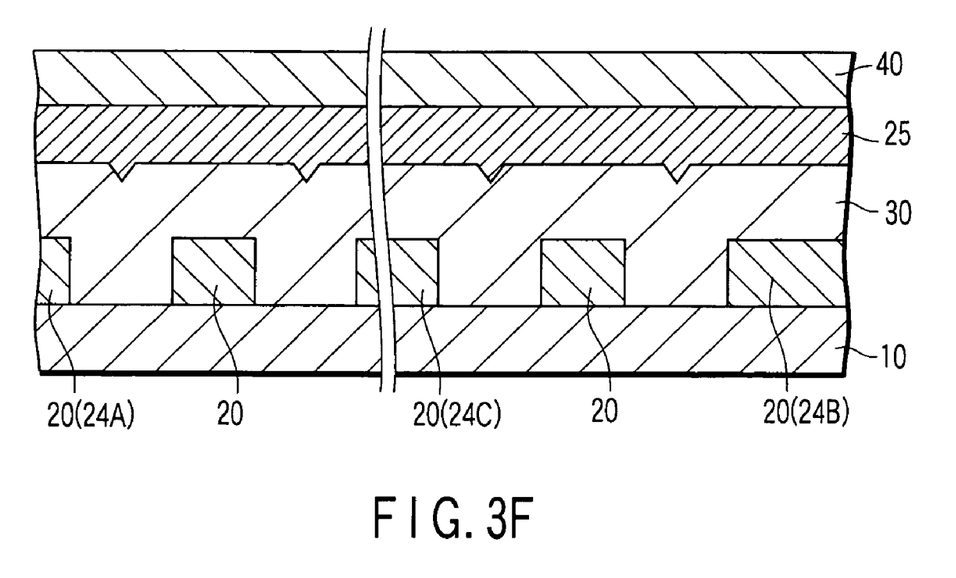
FIG. 3F is view showing an example of a process subsequent to the process of manufacturing the optical branching unit shown in FIG. 3E.

Then, as shown in FIG. 3F, material such as silicon dioxide used as a clad layer 30 is stacked to a predetermined thickness in all areas of the substrate 10 including the core 20 and dummy patterns 24A-24H (only 24A-24C in FIG. 3F). The clad layer 30 may be doped with boric acid (B) or fluorine (F) to decrease the refractive index.

The method of forming the core portion (optical waveguide structure 20), dummy patterns 24A-24H (optical waveguide structure 20) and clad layer 30 is not limited to the CVD method. They may also be formed by a flame hydrolysis deposition method (FHD). The method is not limited to a specific method.

Then, the adhesive layer 25 explained in FIG. 2 is formed on the clad layer 30, and a cover (glass) layer or the lid 40 is fixed to the adhesive layer 25. When the clad layer 30 is protruded (like a convex) in the area corresponding to the core 20 and dummy patterns 24A-24H, the surface unevenness, particularly the protruded portion may be flattened by a not-shown smoothing (polishing) process. In stead of the method of fixing the lid 40 to the clad layer 30 by the adhesive layer 25, the lid 40 can also be fixed to the clad layer 30 by forming the clad layer 30 by the same material as the lid 40 or the material with a thermal expansion rate within a predetermined range, placing the lid on the clad layer 30, and applying predetermined pressure and heat to the lid 40 to assimilate the lid 40 and clad layer 30.

Figure 4:
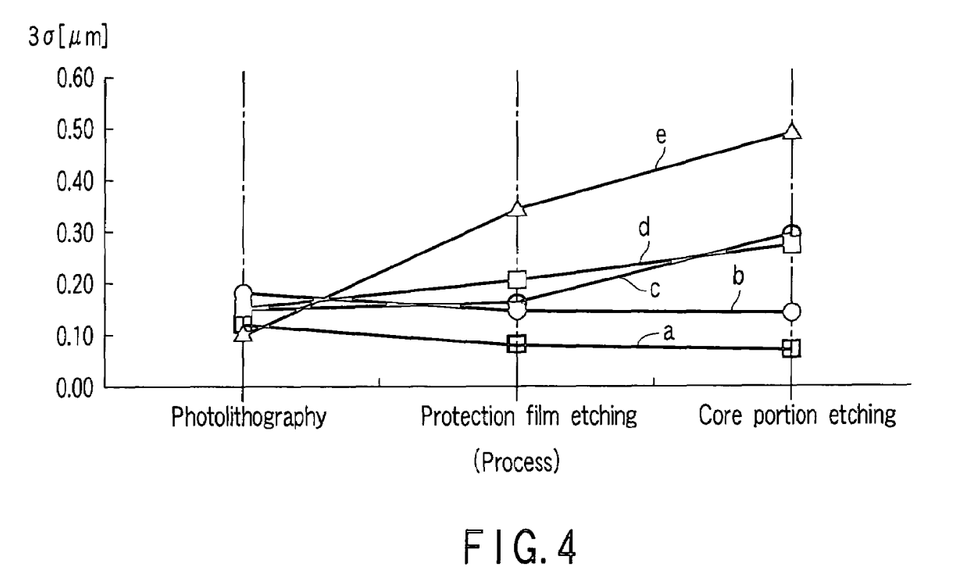
FIG. 4 is a graph explaining the factors of undesirable changes in the width of a core portion (or an area corresponding to a core) in the optical branching unit shown in FIG. 1 and FIG. 2.

FIG. 4 is a graph explaining the factors of undesirable changes in the width of a core portion (or an area corresponding to a core) in the optical branching unit shown in FIG. 1 and FIG. 2, when the optical waveguide structure is etched to form a predetermined optical signal transmission line, or a core portion. In FIG. 4, the horizontal axis is a process to form a core portion, indicating the fluctuation (3σ) in the wide of the core portion (an area corresponding to the core). In FIG. 4, each curve indicates the relationship between the fluctuation (3σ) in the wide of the core portion and the rate of the core portion 20 (FIG. 1) and dummy patterns 24A-24H in the area of the substrate 10 (refer to FIG. 1), that is, an occupation rate. The curve a indicates an occupation rate of 90%, the curve b indicates an occupation rate of 70%, the curve c indicates an occupation rate of 50%, the curve d indicates an occupation rate of 30%, and the curve e indicates an occupation rate of 5%, respectively.

The occupation rate of 90% corresponds to the state that the area of dummy patterns 24A-24H is set outside the core portion so as to leave a space substantially the same as the width of the core portion. The occupation rate of 50% corresponds to the state with no dummy patterns.

As apparent from FIG. 4, the core etching process has the largest fluctuation (3σ) in the width of the core portion. It is also appreciated that the fluctuation (3σ) can be decreased to 0.1 μm or lower by setting the occupation rate to 90% or higher. When the occupation rate is 5%, as indicated by the partition line L in FIG. 1, the etching rate is largely different in the light input side and light output side, and it is reasonable to consider that the fluctuation (3σ) in the core width is increased by the different etching rate. At the output ends 23A-23H (FIG. 1), the space among the core portions is narrowed according to the number of branches (channels), and when the space among the core portions is less than the double of the core portion width (the length in the direction along the surface of the substrate 10, or the core thickness), the dummy pattern is not necessarily needed.

Figure 5:
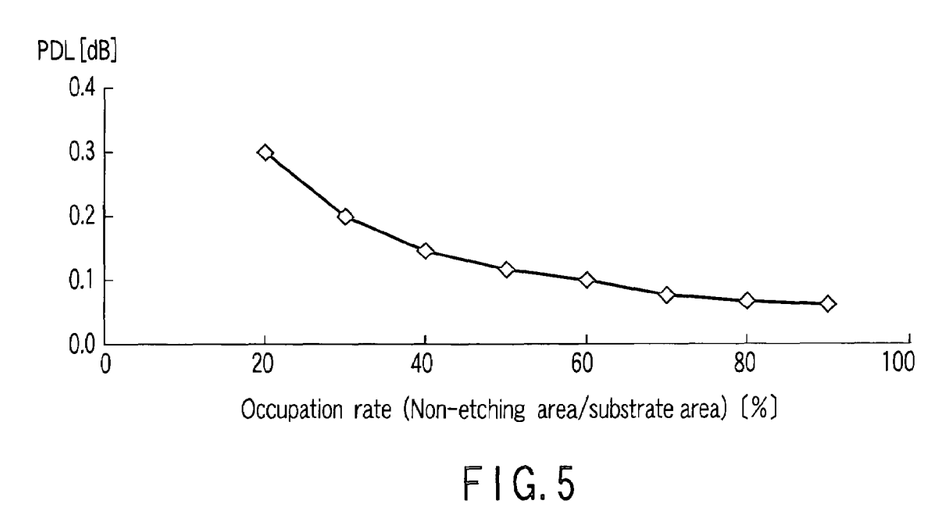
FIG. 5 is graph explaining the relationship between an occupation rate (%) and PDL (dB)

FIG. 5 is graph explaining the relationship between a pattern occupation rate (the total of the core portion and dummy pattern) and PDL, when the lid glass is bonded. The PDL shown in FIG. 5 is obtained by setting the size of the substrate 10 (FIG. 1) to a square of 6 inches (approx. 125 mm) in the shorter side, and by changing the total of the area of the core portion (optical waveguide structure) 20 and dummy patterns 24A-24H (FIG. 1).

As apparent from FIG. 5, it is appreciated that the PDL can be decreased to 0.07(dB) by setting the occupation rate to 90% or higher (setting the area of the dummy patterns 24A-24H to leave the substantially the space as the core portion width in the outside of the core portion).

It is also confirmed that the degree of etching the core portion provided at the end of the substrate 10 higher than the core portion provided at the middle or in the vicinity of the middle of the substrate 10 is decreased by providing the dummy patterns 24A-24H on the substrate 10 so as to have the occupation rate of 70% or higher (leaving a predetermined portion of the optical waveguide structure 20 as a non-etching portion).

Figure 6:
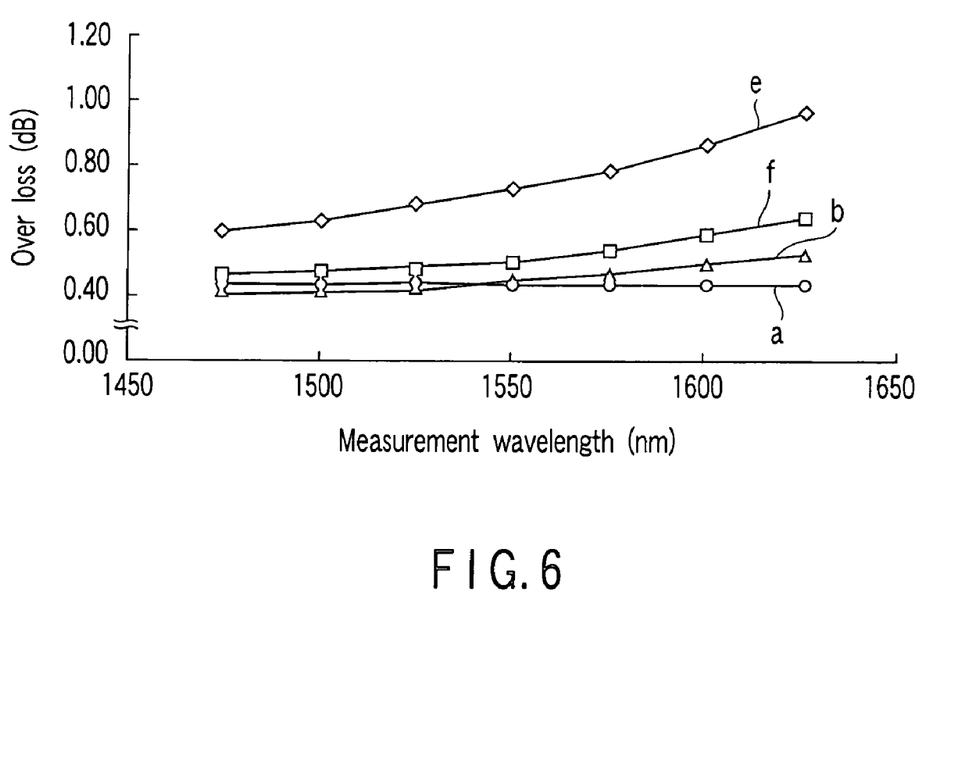
FIG. 6 is graph explaining the relationship between an occupation rate (%) and an over loss (dB).

FIG. 6 is graph explaining the relationship between an over loss (dB) and an occupation rate of a core portion and dummy pattern in a substrate. In FIG. 6, the curve a indicates an occupation rate of 90%, the curve b indicates an occupation rate of 70%, the curve f indicates an occupation rate of 50%, and the curve e indicates an occupation rate of 5%, respectively.

As shown in FIG. 6, when the occupation rate is small, the curved waveguide in the input side is formed thinner than the other parts by the loading effect. Thus, a light beam leaks from the curved part, and a loss increases in the longer wavelength side. When the occupation rate is increased, the line width of the curved waveguide is made uniform, and the leak of light beam is prevented, providing a flat wavelength characteristic. As previously explained in FIG. 4, by setting the occupation rate to 70% or higher, the fluctuation (3σ) in the core portion width can be decreased to 0.15 µm or lower. By setting the occupation rate to 90% or higher, the fluctuation (3σ) in the core portion width can be decreased to 0.1 σm or lower.

As explained hereinbefore, according to the present invention, the etching rate is substantially equal in all areas of the substrate, and the core portion width is prevented from fluctuating largely. Therefore, there is provided an optical branching unit, which has a high wavelength uniformity of insertion loss, and holds a low polarization dependent loss by a dummy core, even if a cover glass (lid) is bonded.

The invention is not limited to the aforementioned embodiments. Various modifications and variations are possible in a practical stage without departing from its essential characteristics. Each embodiment may be appropriately combined as far as possible. In such a case, the effect by the combination is obtained. For example, in the aforementioned embodiments, an optical branching unit to branch an optical signal input mainly to an input side has been explained. The same effect can be obtained in an optical element having an optical waveguide structure on a substrate, such as, an optical wave synthesizer which has two or more input sides and sequentially synthesizes input optical signals, and a 1-input 2-output optical direction coupler which outputs an optical signal input from one of two input ports from two output ports.

There is provided an optical branching unit, which has a high wavelength uniformity of insertion loss, and a low polarization dependent loss.

According to the invention, it is possible to provide an optical branching unit with a high yield, which has a high wavelength uniformity of insertion loss, and holds a low polarization dependent loss even after a cover glass is bonded.

What is claimed is:

1. An optical branching unit comprising:
a light input part which inputs light;
an optical branch which branches the light input to the light input part at a predetermined ratio;
a light output part which guides the light branched by the optical branch to a predetermined position;
an adhesive layer which is formed to a predetermined thickness on the light input part, the optical branch and the light output part;
a substrate which holds the light input part, the optical branch and the light output part;
a cover member which covers the light input part, the optical branch and the light output part on the substrate through the adhesive layer; and
a stress equalizing member which is provided on the substrate independently of the light input part, the optical branch and the light output part, and which prevents a stress generated when the adhesive layer is hardened from acting on any one or all of the light input part, the optical branch and the light output part on the substrate,
wherein the stress equalizing member has an area so that an occupation rate, defined as a total area of the stress equalizing member and the light input part, the optical branch and the light output part relative to a total area of the substrate, is at least 70%.

2. The optical branching unit according to claim 1, wherein the area of the stress equalizing member is such that the occupation rate is at least 90% or.

3. The optical branching unit according to claim 1, wherein the stress equalizing member is made of a same material as the light input part, the optical branch and the light output part.

4. The optical branching unit according to claim 1, wherein the stress equalizing member is formed together with the light input part, the optical branch and the light output part.

5. An optical branching unit comprising:
a light input part which inputs light;
an optical branch which branches the light input to the light input part at a predetermined ratio;
a light output part which guides the light branched by the optical branch to a predetermined position; and
a stress equalizing member which is: (i) provided on a substrate independently of the light input part, the optical branch and the light output part, (ii) made of a same material as the light input part, the optical branch and the light output part, and (iii) has an area so that an occupation rate, defined as a ratio of the area of the stress equalizing member to an area of the substrate except the light input part, the optical branch and the light output part, is at least 70%.

6. The optical branching unit according to claim 5, wherein the area of the stress equalizing member is such that the occupation rate is at least 90% or.

7. The optical branching unit according to claim 6, wherein the stress equalizing member is formed together with the light input part, the optical branch and the light output part.

8. A method of manufacturing an optical branching unit, comprising:
   stacking an optical transmission material layer, with a refractive index higher than a substrate usable as an optical waveguide, to a predetermined thickness on the substrate;
   defining a first area which is used to transmit an optical signal, and a second area which is provided around the first area with a predetermined space to make an etching rate of etching the first area substantially equal, wherein an area of the second area is set so that an occupation rate obtained by dividing a total area of the first and second areas by a total area of the substrate is at least 70%;
   forming a non-etching pattern in each of the first area and second area, and patterning a remaining area of the substrate by etching;
   forming a third area different from the first and second areas by providing a material with a refractive index lower than the optical transmission material layer in all areas of an optical transmission material layer remaining non-etched after the patterning and an exposed substrate area; and
   bonding a cover member to the third area through an adhesive.

9. The method of manufacturing an optical branching unit according to claim 8, wherein an area of the second area is set so that the occupation rate obtained by dividing the total area of the first and second areas by the total area of the substrate is at least 90.

10. The method of manufacturing an optical branching unit according to claim 8, wherein an area of the second area is defined to weaken an influence of a stress generated when a cover layer is bonded, acting upon the first area.

11. An optical branching unit comprising:
    a light input part which inputs light;
    an optical branch which branches the light input to the light input part at a predetermined ratio;
    a light output part which guides the light branched by the optical branch to a predetermined position;
    an adhesive layer which is formed to a predetermined thickness on the light input part, the optical branch and the light output part;
    a substrate which holds the light input part, the optical branch and the light output part; and
    a non-optical signal transmission area which is provided on the substrate independently of the light input part, the optical branch and the light output part, and which decreases a degree that a line width, defined as a length of each of the light input part, the optical branch and the light output part along a surface direction of the substrate becomes unequal, when the light input part, the optical branch and the light output part are formed on the substrate,
    wherein the non-optical signal transmission area has an area so that an occupation rate, defined as a total area of the non-optical signal transmission area and the light input part, the optical branch and the light output part relative to a total area of the substrate, is at least 70%.

12. A method of manufacturing an optical branching unit, comprising:
    stacking an optical transmission material layer, with a refractive index higher than a substrate usable as an optical waveguide, to a predetermined thickness on the substrate;
    defining a first area which is used to transmit an optical signal, and a second area which is provided around the first area with a predetermined space to make an etching rate of etching the first area substantially equal, wherein an area of the second area is set so that an occupation rate obtained by dividing a total area of the first and second areas by a total area of the substrate is at least 70%;
    forming a non-etching pattern in each of the first area and second area, and patterning a remaining area of the substrate by etching; and
    forming a third area different from the first and second areas by providing a material with a refractive index lower than the optical transmission material layer in all areas of an optical transmission material layer remaining non-etched after the patterning and an exposed substrate area.

* * * * *